United States Patent [19]

Litman et al.

[11] 4,281,856
[45] Aug. 4, 1981

[54] WET-DRY CEMENTABLE COUPLING FOR PLASTIC PIPE

[76] Inventors: Alan L. Litman, 114 Hartwood Dr., Pittsburgh, Pa. 15208; James P. Strode, 16 Andros Rd. - Ocean Reef, Key Largo, Fla. 33037

[21] Appl. No.: 928,826

[22] Filed: Jul. 28, 1978

[51] Int. Cl.³ .............................................. F16L 55/00
[52] U.S. Cl. ......................................... 285/15; 285/21; 285/332; 285/369; 285/383; 285/423; 285/DIG. 16
[58] Field of Search ........... 285/15, 31, 423, DIG. 16, 285/21, 332, 369, 383; 156/98, 294, 295; 138/89

[56] References Cited

U.S. PATENT DOCUMENTS 2,825,587  3/1958  Barta et al. ...................... 285/423 X
3,701,548  10/1972  McGuire ...................... 285/DIG. 16
3,826,521  7/1974  Wilhelmsen ...................... 285/31 X
3,857,588  12/1974  Curtin ...................... 285/31
4,035,002  7/1977  Curtin ...................... 285/31

FOREIGN PATENT DOCUMENTS 705688  3/1954  United Kingdom ...................... 285/21

Primary Examiner—Dave W. Arola
Attorney, Agent, or Firm—Alfred B. Levine

[57] ABSTRACT

A cementable coupling for plastic pipe, that may be employed whether the parts are wet or dry, including cementable fitting and sleeve members that initially provide a dry seal near the end of the pipe, permitting initial drying of the pipe upstream of the dry seal, and enable later cementing of these members together and to the pipe at a location upstream of the dry seal.

8 Claims, 3 Drawing Figures

WET-DRY CEMENTABLE COUPLING FOR PLASTIC PIPE

BACKGROUND OF THE INVENTION

1. Field of the Invention

This invention generally relates to couplings for plastic pipe, and more particularly to such couplings finding particular utility for repair or replacement of sections to previously installed pipes regardless of whether the pipes are in wet or dry condition.

2. Description of the Prior Art

Many different kinds of cementable pipe couplings are presently available, and are being satisfactorily used, for the installation of new plastic piping systems. However where repairs or replacements are to be made in existing systems, such available couplings are not satisfactory, or even usable without subsequent leakage, unless the pipe joint surfaces to be connected are completely "bone" dry since the presently available solvent type cements for plastic pipes will not properly seal if the surfaces are wet or moist.

Where repairs or changes are to be made in preexisting horizontal runs of plastic vinyl piping, for example, the system must first be completely drained, often over a long period of time of several hours, until the dripping of water entirely discontinues. If not, the mating surfaces of the pipes to be joined often become whetted, or moistened, reducing the effectiveness of the cemented joint seal.

SUMMARY OF THE INVENTION

According to the present invention there is provided an improved coupling, and method, for joining plastic pipe that may be satisfactorily employed whether the plastic piping is either wet or dry, and even under conditions where some water pressure may exist in the line. This is generally performed by providing an initial "dry" seal near the end of a pipe that may be dripping water, drying the pipe upstream of the "dry seal", and thereafter providing a cementable sealed region at a position somewhat upstream of the "dry" sealed area, with the combination of these two seals providing an effective liquid tight joint regardless of presence of moisture or of water dripping or flowing from the end of pipe being coupled.

More specifically, the first "dry" seal is initially made using a fitting having a deformable "O" ring, or the like, applied to the end of the pipe. This first seal enables the outer surface of the pipe that is disposed upstream of this fitting to be completely dried and to remain dry. Subsequently, an encircling sleeve that has been previously slipped over the pipe is cemented onto the dried area of the pipe and also cemented onto this fitting. As a result, the combination of the first and second seals, enables the second seal to be cemented onto completely "bone" dry surfaces of the pipe and fitting regardless of the presence of moisture inside the pipe, in adjoining areas, and even if water is dripping from the pipe.

According to further features of the invention the improved construction of the fitting and sleeve members provides precise interlocking engagement of these members in such manner that the cement is always properly and completely distributed over the surfaces to be joined. This is performed by constructing the two members to interengage in such manner as to provide a "piston and cylinder" pressurized application of the cement to the appropriate surfaces as they are assembled together, thereby to always insure a proper and complete distribution of the cement as desired.

According to still further features of the invention a properly sealed joint may be made even in the event of some water pressure in the pipe, by additionally employing a removable plug or stopper in the pipe to temporarily discontinue the flow prior to application of the fitting. A removable splash shield or guard may also be employed to assist in maintaining the outside surface of the pipe in a dry condition despite a wet or dripping environment.

DETAILED DESCRIPTION OF PREFERRED EMBODIMENT

Figure 1:
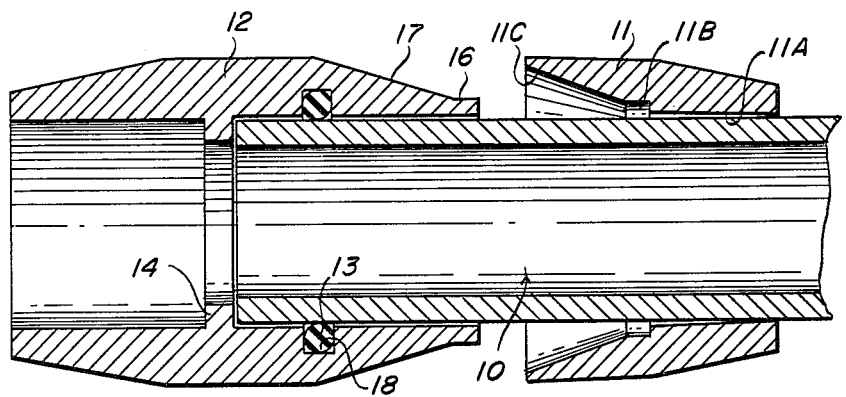
FIG. 1 is a cross-sectional view of a pipe to be coupled and part of the preferred coupling members prior to assembly.
Figure 2:
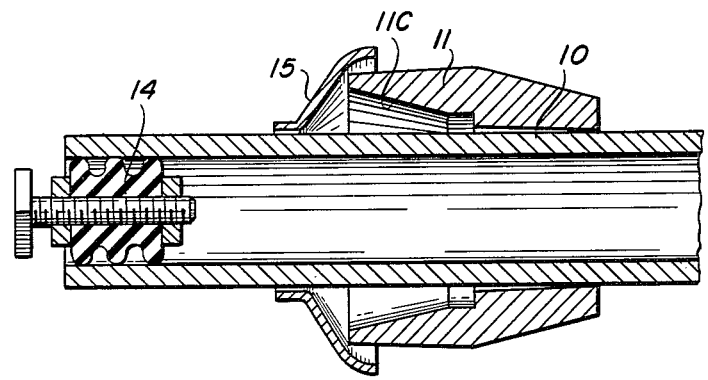
FIG. 2 is a cross-sectional view, similar to FIG. 1, showing both preferred coupling parts on the pipe prior to assembly.

As shown in FIG. 1 and FIG. 2, the pipe coupling in dissassembled form basically comprises a cementable annular sleeve member 11 slipped over the pipe 10 and axially positioned upstream of the end of the pipe 10, and an annular fitting member 12 applied over the end of the pipe 10 and to be cementable to the sleeve 11 at a location upstream of the end of the pipe 10.

The sleeve member 11 is formed with an extended annular surface area 11a encircling and confronting the outer surface of the pipe 10. This area 11a may be taperd slightly upwardly to the left, as shown. It leads to and is in communication with a notched annular recess 11b encircling the pipe. Extending leftward from this recess 11b and progressively opening outwardly away from the pipe 10, the sleeve 11 is formed with a conically shaped undercut region 11c, over an extended surface area for the purpose of mating interengagement with a similarly shaped conical surface area 17 of the fitting 12.

The fitting member 12 is formed with a tubularly shaped inlet socket to receive the end of the pipe 10, as shown, and is provided with an internal recess 18 for accomodating a deformable "O" ring sealing member 13. When the fitting 12 is applied over the pipe 10 with the end of the pipe 10 striking an integrally formed stop ring 14, the "O" ring 13 is deformed between the outside of the pipe 10 and the internal recess 18 in the fitting 10 to provide a "dry" fluid tight seal between the fitting 12 and pipe 10.

The outside surface of the fitting 12 facing the sleeve 11 is formed in an extended conically shaped surface area 17 for interengagement into the undercut region 11c of the sleeve 11a. At the far righthand end of the fitting 12, this conical tapered region 17 leads to a ring shaped end tip 16 on the fitting 12 having a substantially rectangular configuration, as shown, that is adapted to enter into the recessed area 11b of the sleeve 11, as best shown in FIG. 3.

Figure 3:
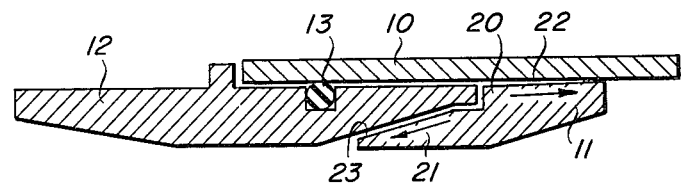
FIG. 3 is a similar cross-sectional view of the pipe showing the coupling members cemented together and to the pipe.

As best shown in FIGS. 2 and 3, the "O" ring seal 13 is preferably located at a distance upstream of the end of the pipe 10 and provides an initial "dry" seal at that area when the fitting 12 is applied onto the end of the pipe.

This initial "dry" seal enables the outer surface of the pipe 10, disposed upstream of this fitting 12, to be completely dried of moisture and to remain dry as the coupling members are assembled together and cemented to each other and to the pipe.

In the event that the pipe 10 is dripping an excessive quantity of water, or where there may be water flowing or water pressure in the pipe line, the end of the pipe 10 may be initially plugged by a suitable removable plug 14, such as an expandable plug or other closure, as generally shown in FIG. 2, before application of the fitting 12 onto the pipe 10. After insertion of the plug or stopper 14 to temporarily terminate the flow of water, the outside of the pipe 10 can be carefully wiped dry before application of the fitting 12 to make the initial "dry" seal.

Additionally in the event that an excessive quantity of water may be present, a tightly fitting removable splash shield disc 15 of polyethylene may also be slipped over the pipe 10 and positioned upstream, as shown in FIG. 2, to prevent any moisture from reaching the undercut region 11c of the sleeve 11. After application of the splash shield 15, the outer surfaces of the pipe 10 upstream of the shield 15, and downstream of the sleeve 11 can be carefully dried, the plug may be removed, and the fitting 12 applied to the pipe 10 to effect the initial "dry" seal. Before cementing the sleeve 11 and fitting 12 together, the splash shield may be easily removed, by splitting the thin plastic disc 15 and removing it from the pipe 10.

To complete the coupling by cementing the members, a liberal quantity of suitable cement, such as a viscous vinyl cement for vinyl pipe 10, is coated onto the outside tapered surface 17 of the fitting 12 and onto approximately one inch along the outer surface of the pipe 10 between the fitting 12 and sleeve 11. The sleeve 11 is then slid backwardly, to the left, along the pipe 10 toward the fitting 12, as shown in FIG. 3, sweeping cement ahead of it and collecting the cement inside of the annular recess region 11b of the sleeve 11. As the sleeve 11 engages the main outer body of the fitting 12, the circumferentially disposed ring portion 16 located at the right hand end of the fitting 12 enters into the correspondingly shaped recess 11b provided in the sleeve 11, providing in effect, a "piston and cylinder" to compress the cement collected in the recess 11b and force it under pressure to the right and into the region 22 between the underside 11a of the sleeve 11 and the outside surface of the pipe 10. If desired, the region 22 may be tapered slightly upwardly toward the left. The compression of the cement by this "piston and cylinder" action also forces the cement under pressure upwardly and to the left into region 23 between the mating conical surfaces 11c and 17 of the sleeve and fitting 12, respectively. This pressurized forcing of the vinyl cement between the sleeve 11 and pipe 14 is depicted in FIG. 3 by the arrow 20 pointing to the right; and the forcing of cement into space 23 between the surfaces of the sleeve 11 and fitting 12 as shown by the arrow 21. To insure that the cement is uniformly distributed over the surface areas, the sleeve 11 may also be slightly rotated as it slid backwardly over the pipe 10 and into interengagement with the fitting 12. It will be appreciated that "piston" part 16 is slightly smaller in size than opening 11b in sleeve 11, thereby providing sufficient spacing to enable the flow of cement as described.

As best shown in FIG. 3, the cemented areas located underneath the sleeve 11 at 22, and located between the sleeve 11 and fitting 12, in the area 23, are both disposed at a considerable distance upstream from the wet end of the pipe 10. Additionally the added "dry" seal provided by the deformed "O" ring is also maintained permanently in place after the members are cemented together.

Many changes may be made by one skilled in the art without departing from the spirit and scope of this invention. Accordingly, this invention is to be considered as being limited only by the following claims.

What is claimed is:

1. A wet-dry cementable coupling for plastic pipe, for repair or replacement to a preexisting pipe section regardless of its wet-dry condition comprising:

a plastic sleeve member axially slidable over a preexisting pipe section and having an extended surface area closely adapted to encircle and be cementable to the outside surface of the pipe.

a plastic fitting having an inlet for receiving the end of the preexisting pipe and containing an inner dry seal means engageable with the outer surface of the pipe to form a fluid tight seal, thereby enabling the outer surface of the preexisting pipe to be dried upstream of the dry seal, said plastic sleeve member and plastic fitting being formed to provide closely interengageable mating surfaces when in the driest area the sleeve member is axially positioned on the pipe abutting the fitting member, one of said sleeve member and fitting member having an annular recess that is cylindrical in longitudinal cross-section for encircling the pipe and in communication with both the space between the abutting surfaces of the sleeve ad fitting, and in communication with the space between said extended surface area of the sleeve and the outer surface of the pipe, and the other of said sleeve member and fitting member having a projection portion corresponding in shape to the annular recess in the other member and adapted to enter and closely interfit with the recess when the two members are abutted together on the pipe, said projection and recess effectively providing a piston and cylinder action to force cement under pressure between the confronting surface areas of the sleeve member and pipe, and additionally between the closely mating surfaces of the sleeve member and fitting member when cement is applied onto the pipe surfaces between these two members prior to assembly and thereafter the two members are abutted together.

2. In the coupling of claim 1, said plastic sleeve provided with a conically shaped undercut surface facing said fitting and tapering downwardly to said annular recess provided in said sleeve member, and the outer surface of said fitting member having a corresponding conical tapered region to closely interfit into the undercut in said sleeve, and the outer conical tapered region of the fitting terminating in an annular ring shaped portion to fit into the annular recess of the sleeve member for providing said described piston-cylinder action.

3. In the coupling of claim 1, said annular recess being provided in said sleeve and being circular in cross section and in communication with a conically shaped undercut region opening outwardly toward said fitting member, and said fitting being provided with a conically shaped outer surface terminating in an annular ring portion, that is circular in cross section thereby to closely mate with the conical undercut and annular recess in the sleeve member.

4. In the coupling of claim 3, said extended surface area of the sleeve encircling the pipe being formed to slightly taper in a direction axially along the pipe with its larger opening in communication with said annular recess to receive the pressurized cement.

5. In the coupling of claim 1, said annular recess being provided in said sleeve and said extended surface area for encircling the pipe being tapered in cross section axially along its length, with the larger base of the tapered region in communication with the annular recess for receiving the pressurized cements.

6. In the coupling of claim 1, the addition of a splash shield slidable onto said pipe after said sleeve member is applied to enable drying of the outside of the pipe upstream of said shield and to prevent fluid from the end of the pipe from whetting the outer surface of the pipe upstream of the shield.

7. In the coupling of claim 1, the inner seal means contained within said fitting comprising an "O" ring of deformable material.

8. A wet-dry cementable coupling for plastic pipe, for repair or replacement to a preexisting pipe section regardless of its wet or dry condition comprising:
- a sleeve member for encircling the pipe and being axially positionable along the pipe away from the joint area,
- a fitting member having an inlet for receiving the end of the pipe and having a portion encircling the pipe and axially extending for a distance upstream of the pipe joint area,
- a deformable seal accommodated inside of the extended portion of the fitting member to deformably interengage the outside of the pipe with the inside of the fitting member and provide a dry seal area near the pipe joint area and thereby prevent any fluid from inside the pipe from wetting the outside of the pipe at locations upstream of the joint area, the outside of the pipe located upstream of the fitting member and the outer surface of the fitting being dryable after the dry seal is made,
- a surface of the fitting member and an adjoining surface of the sleeve member adapted to mate and interfit along an extended tapered region at an axial position along the pipe that is disposed upstream of both the pipe joint area and the deformable dry seal area, thereby being cementable together in a dry environment regardless of the presence of fluid escaping from the end of the pipe,
- and the sleeve member having an additional portion extending upstream of the fitting member for encircling the pipe, whereby the sleeve is cementable to both the fitting member along the extended tapered region and to the outside of the pipe, both at axial locations upstream of the end of the pipe and the dry seal area and wherein a portion of the inside of the sleeve and a portion of the outside of the fitting member being correspondingly tapered to interfit with one another along said tapered region and one of said members having a cylindrical annular recess in communication with the tapered region and the other having a cylindrical portion to enter into the annular recess, thereby providing a piston and cylinder action to force cement under pressure between the additional portion of the sleeve member and the pipe and between the taper of the sleeve member and the fitting member.

* * * * *